United States Patent

[11] 3,585,427

[72] Inventor Kurt Paule
 Stuttgart Oberturkheim, Germany
[21] Appl. No. 825,760
[22] Filed May 19, 1969
[45] Patented June 15, 1971
[73] Assignee Robert Bosch G.m.b.H
 Stuttgart, Germany
[32] Priority May 18, 1968
[33] Germany
[31] P 17 63 390.8

[54] ELECTRONIC SPEED ARRANGEMENT FOR ELECTRICALLY OPERATED POWER TOOLS
 4 Claims, 4 Drawing Figs.
[52] U.S. Cl. .................................................... 310/50,
 310/68, 51/170.2
[51] Int. Cl. .................................................... H02k 7/14
[50] Field of Search .......................................... 310/68, 47,
 50, 72, 174, 62, 83; 318/327, 306; 51/170.2

[56] References Cited
 UNITED STATES PATENTS
1,369,457 2/1921 Meyer ............................ 318/327
1,954,977 4/1934 Albertson ........................ 51/170.2
1,976,499 10/1934 Hochstetter ..................... 310/327
2,273,626 2/1942 Connell .......................... 51/170.2
2,553,688 5/1951 Thompson ...................... 51/170.2
3,280,351 10/1966 Wolter ........................... 310/50
3,424,961 1/1969 Leenhouts ...................... 318/327
3,458,793 7/1969 Tsergas .......................... 310/68

Primary Examiner—D. X. Sliney
Assistant Examiner—R. Skudy
Attorney—Michael S. Striker ABSTRACT: A speed control arrangement for electrically operated power tools in which an electronic control circuit within the housing of the tool regulates the speed between no-load and full-load operation of the tool, so that the speed is held substantially constant. The rotor of the motor within the tool is mounted in combination with bevel gears so as to form an angle polishing machine for portable applications. A terminal block mounted within the handle of the portable tool interconnects the wiring between the motor and the electronic controlling circuit. The electronic circuit provides for the operation of the tool from a single-phase utility outlet, and will disconnect the motor from the line when the maximum allowable speed is exceeded.

PATENTED JUN 15 1971
3,585,427
SHEET 1 OF 3
FIG.1
FIG.2
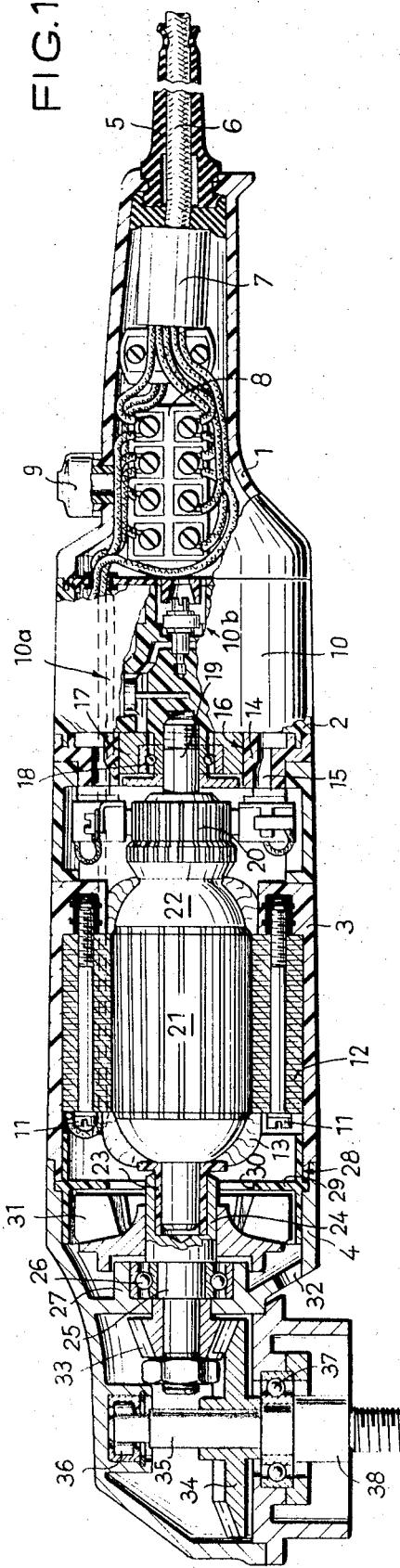
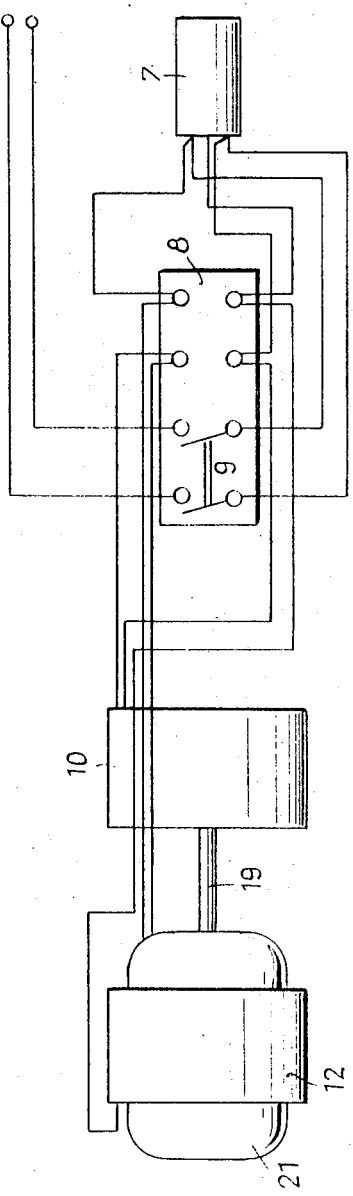
INVENTOR:
Kurt PAULE
By
his ATTORNEY

ELECTRONIC SPEED ARRANGEMENT FOR ELECTRICALLY OPERATED POWER TOOLS

BACKGROUND OF THE INVENTION

The present invention resides in an electrically operated power tool, particularly an electrically driven polishing machine with built-in alternating current commutator motor. The arrangement includes an electronic speed regulating device. Electrically operated power tools are known in the art, in which electronic speed regulating arrangements, either built into the power tool or separate therefrom, provide continuous variation in the motor speed between zero and a maximum value.

These conventional electrically operated power tools exhibit for every set speed of the series-wound AC commutator motor, a disadvantage of being considerably dependent upon the torque. Thus, in such operation of these motorized power tools, the speed which may be set is very much a function of the output torque. The advantage of adjusting the speed in such conventional electrically operated power tools, therefore, is again lost for the most part, since the set speed can only be maintained for the idling state. When the tool is used under load, the speed drops immediately, and must be readjusted manually afterwards. Such a requirement is, however, not very practical. Aside from this, any reduction in the speed of the conventional electrically operated power tools, is accomplished through a reduction in the applied power. When, under these conditions, the tool is operated under load and the speed of the tool falls as a consequence of the applied load, the effect of the speed reduction through decrease in the applied power is superimposed upon the effect of reduced speed due to load, so that an undesirable operating speed is realized.

Accordingly, it is an object of the present invention to provide an electronic circuit for regulating the speed of electrically operated power tools with AC commutator motor, so that the speed remains substantially constant between the idling state and the maximum permissible for load. In accordance with the present invention, this object is achieved by providing that the power output in the form of the product of the torque and speed, rises functionally so that at the upper limit, the relationship between the conventional idling speed and the conventional load speed has the ratio of substantially 1.6:1. Although a power rise or increase of 60 percent may be possible in special cases, it is of advantage to limit most applications to approximately 40 percent increase in power. This results from the condition that operation beyond this latter limit gives rise to more severe requirements with regard to the construction of the windings and the commutator for resistance against centrifugal forces. The operating life of the ball bearings, and the precision fabricating requirements, particularly from the viewpoint of balancing, are also factors which must be taken into consideration when exceeding this limit. It is also possible, of course, in portable polishing machines to use the same power with less effort at higher load speeds, by pressing the polishing disc less against the tool.

In accordance with the present invention, the electrically operated power tool also achieves, under varying load, operation at the same optimum cutting speed. As a result, higher power is developed, through the tool of the present invention. It also follows from the present invention that due to the substantially constant speed, even at high load torques, the motor becomes well cooled, a condition which is essential particularly at such higher loads. As a result of such cooling action, the increased heat losses are removed effectively. The increased heat losses result from the increased power of the motor. It is to be noted, in this regard, that the mass of air required is proportional to the cooling fan speed, whereas the generated pressure varies as the square of this speed. A specific pressure drop is required for the purpose of conveying the cooling mass of air through the power tool. The heat transfer also rises with increase in air mass velocity. As a result, the electrically operated power tool, in accordance with the present invention, is also adapted to deliver the increased power also at full load.

As a result of the design of the present invention, the cooing effect within overload regions of operation, is also more favorable than in conventional electrically operated power tools. The present invention also prevents, through the electronic regulating arrangement, that high speeds and overspeeding of the driving motor upon removal of the load upon the power tool. The particular advantage in the use of the present invention resides that the power tools, especially portable polishing machines, are not driven below the optimum cutting speed, as in conventional electrically operated power tools. The optimum cutting speed is substantially identical to the permissible surface speed of the tool, and must not be exceeded during the idling condition of the tool.

The electronic regulating arrangement of the present invention, furthermore, can serve to rapidly reduce the applied voltage to the motor when exceeding the permissible maximum torque, so that the motor is protected against overloads.

The electronic regulator of the preset invention can, furthermore, reduce the starting current of the AC commutator motor for corresponding increase in the starting time, so that the power tool may be operated from a single-phase utility outlet, without affecting the line fuses. In addition to this advantage of applying the power tool to a single-phase line, the tool is also a safer device during operation. Thus, since the starting torque does not occur suddenly and at such magnitudes as in conventional power tools, the danger that the tool may be torn from the hand of the operator or user, is substantially eliminated.

SUMMARY OF THE INVENTION

A motor speed control arrangement for use in conjunction with electrically operated power tools, particularly portable polishing machines. An alternating current commutator motor operates in conjunction with an electronic speed regulating arrangement or device which controls the motor speed for variable load conditions. The speed regulating device serves to maintain the output shaft speed of the motor substantially constant between no-load or idling conditions and full load conditions at which the motor develops the maximum permissible torque. When this maximum permissible torque is exceeded through an excessive load, the electronic speed regulating device has means for rapidly decreasing the voltage applied to the motor, so that the latter is protected against overload and damage conditions. The speed regulating arrangement, furthermore, attenuates the starting current of the driving motor for corresponding increase in the starting time, so that the electrically operated power tool may be operated from a single-phase utility outlet or power line. As a result of this feature, the line fuses are not actuated or affected. The electronic speed regulating device, in addition, maintains the speed of the motor unaffected from line voltage fluctuations within the range of plus or minus 15 percent. The electronic speed regulating arrangement also has provision for disconnecting the driving motor from the power supply line, when the maximum permissible rotational speed is exceeded by 10 percent.

The novel features which are considered as characteristic for the invention are set forth in particular in the appended claims. The invention itself, however, both as to its construction, and its method of operation, together with additional objects and advantages thereof, will be best understood from the following description of specific embodiments when read in connection with the accompanying drawing.

BRIEF DESCRIPTION OF THE DRAWING

FIG. 1 is a sectional view through the axis of rotation of the electrically operated power tool, and shows the interior construction with the speed regulating arrangement and switch mounted in place, in accordance with the present invention;

FIG. 2 is a schematic wiring diagram of the power tool in the form of an angle polisher, of FIG 1;

DESCRIPTION OF THE PREFERRED EMBODIMENTS

Figure 3:
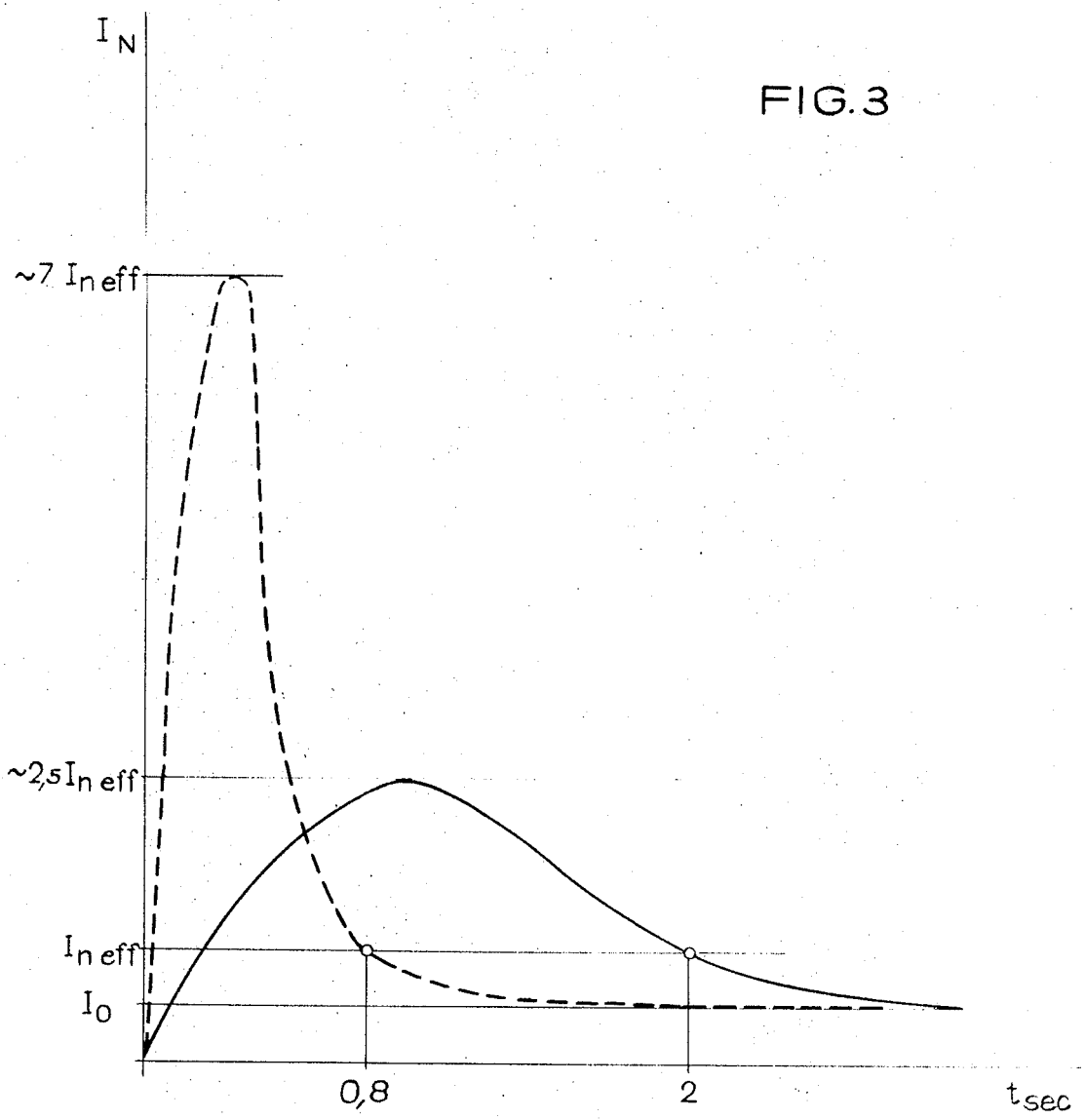
FIG. 3 is a graphical diagram and shows the starting current of the angle polisher of FIG. 1, as a function of time.

In referring to the drawing, the expressions "behind or in back of," used to describe the drawing, denote the direction toward the transmission cable. The expression "in front of" denotes the direction toward the angular drive, whereas the expression "below" denotes the direction from the polishing disc spindle. The usage of the expression "above," on the other hand, denotes the opposite direction of the latter.

The angle polisher shown in FIG. 1 has a handle 1, an intermediate housing 2, a housing 3 for the motor and made of plastic material, and a housing 4 for the driving linkage. The parts are held together through bolts and screws, not shown in the drawing. The handle 1 is formed of synthetic material, such as plastic, for example, and a hollow cross section. At the back end of the handle, an elastic bushing 5 is inserted. A cable 6 passes through this bushing 5 and into the handle. Through a capacitor 7 of hollow construction, the cable 6 enters the interior of the handle. The capacitor 7 serves as a filter type of capacitor. A terminal board 8 is secured within the interior of the handle. A switch 9 is mounted above the terminal board, and on the handle.

A speed regulating arrangement in the form of an electronic regulating circuit 10 is built into the intermediate housing 2. This regulating circuit 10 controls the feed voltage of the driving motor in the conventional manner through phase control of both half waves. A laminated stator member 12 is secured with bolts 11 within the motor housing 3. This laminated stator member 12 carries a stator coil 13. The motor housing 3 is closed-off through a wall 14 at its back end. An opening 16 is provided through the center of this wall 14, and a number of additional openings 15 are arranged exterior to the central opening. A metallic bearing 17 is injection molded into the central opening 16. A ball bearing or roller bearing 18 is inserted into the metallic bearing 17. The interior ring of the ball bearing is slipped upon the shaft 19. The shaft 19 which is supported within the motor housing through the roller bearings 18, carries a commutator 20 in front of the roller or ball bearing 18. This shaft 19, furthermore, carries a rotor member 21 upon which a coil 22 is wound. The front end of the shaft 19 is inserted into an insulating bushing 23 which is secured within the hollow-back end 24 of a shaft 25. The shaft 25 is held within a transverse wall 27 of the driving linkage housing 4, through means of a bearing 26. The motor housing 3 and the driving linkage housing 4 are assembled together through the application of an intermediate flange 28. This flange which is also designed in the form of an air-transmitting type of flange, has a disc 29 arranged transverse or perpendicular to the axis of the rotor, a central opening 30 within this disc 29.

A cooling member or impeller 31 is mounted upon the back end 24 of the shaft 25 in front of the flange 28. The impeller 31 sucks heated air out of the motor and from the speed regulating arrangement. This heated air is then blown or forced to the exterior of the tool, by way of the openings 32 of the driving linkage housing in accordance with the present invention. A bevel pinion 33 is mounted at the front end of the shaft 25. The bevel pinion engages a bevel gear 34 which, in turn, is mounted upon the shaft 35 for the polishing disc. The shaft for the polishing disc is rotatably mounted in place through a roller bearing 36 and a ball bearing 37, which in turn, are held within the housing for the driving linkage. This shaft has an end portion 38 projecting from below of the driving linkage housing. The projecting portion 38 is designed so that the polishing disc may be mounted thereon. At the back end of the shaft 19, a safety arrangement 10a and a tachogenerator 10b are arranged as parts of the regulator 10. Since these parts are not the object of the present invention, they are not further described and are only representatively designated in the drawing.

In the diagram of FIG. 2 of the angle polisher, it may be seen that the leads of the cable 6 are connected to two terminals of a switch 9 within the interior of the angle polisher. Through the switch 9, these leads may be interrupted The movable contacts of the switch 9 corresponding to the fixed terminals or contacts to which the leads of the cable 6 are connected, lead to the capacitor 7. An electrode lies within the dielectric of this capacitor, and serves as a third conductor of a commonly referred to Y-connection. This electrode within the capacitor, serves as a ground connection, and is connected with the stator member 12 of the motor, through the terminal board 8. A symmetrical relationship is forced upon the capacitor through the application of this ground connection. One of the connections from the capacitor leads to the electronic regulating circuit 10, by way of the terminal board. The other connections lead directly to the motor, through the terminal board. The leads or connections from the electronic regulating circuit are also applied to the motor, by way of the terminal board.

The solid curve in FIG. 3 shows graphically the current requirement of the angle polisher of FIG. 1, when in the idling state. The curve in dashed or broken lines denotes the current requirement of an angle polisher without speed regulating means, for comparison purposes. This graphical representation refers to measurements taken on apparatuses or machines in service, and shows that for the conventional polishers, the starting current rises rapidly to approximately seven times the effective nominal current. After reaching this peak value, the current drops rapidly, and falls below the effective nominal current after about 0.8 seconds from the instant that the machine was switched on. The current in the conventional machine then tends asymptotically towards the current corresponding to the idling value. In the angle polisher, in accordance with the present invention, on the other hand, in which a regulating arrangement is included in the form of an electronic regulating circuit, the current rises only to approximately 2.5 times the effective nominal current value. After approximately 2 seconds, this current in the machine of the present invention drops below the effective nominal value. Through the combined reduction in the magnitude of a current when starting, and increase in the starting time, it is possible to operate the angle polisher of the present invention, from a single-phase utility outlet, without affecting the line fuses.

Figure 4:
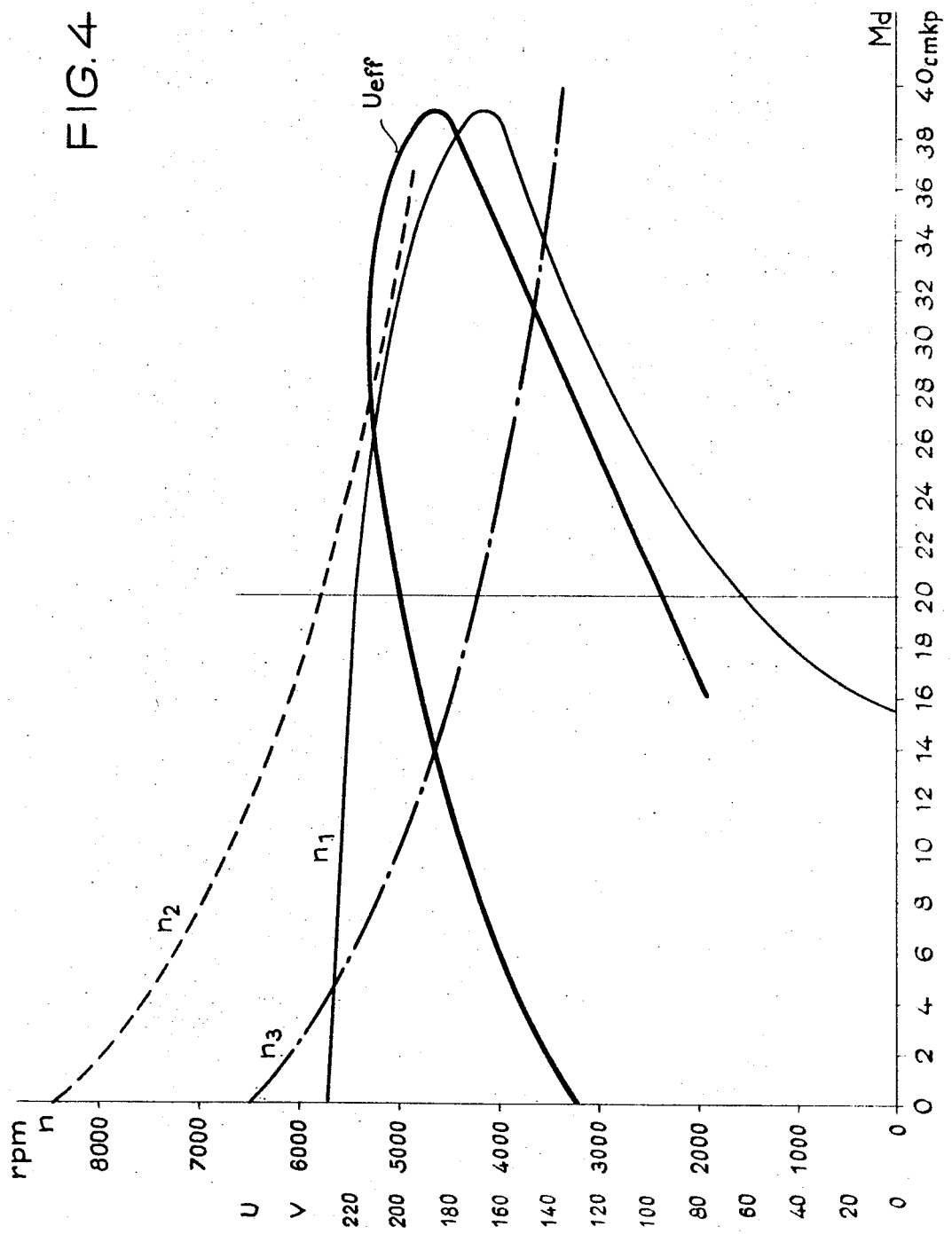
FIG. 4 is a graphical diagram and shows as a function of torque load the following parameters: the feed voltage applied to the motor by the speed regulating arrangement; the motor speed; the motor speed without the use of a speed regulating arrangement of the present invention; the motor speed of a conventional angle polisher.

FIG. 4 shows graphically the relationship of the feed voltage $U_{eff}$ which is applied to the motor through the electronic regulating circuit, as a function of the load torque $M_d$ in foot lbs. The graphical representation shows that this feed voltage increases with load until the attainment of a torque which is approximately one and a half times the nominal value. After that, the voltage drops readily until the torque corresponding to twice the nominal value is reached. At that point, the regulator shifts and reduces also the feed voltage with decrease in load torque. The speed $n_1$ of the angle polisher, which is also superimposed upon the graphical representation of FIG. 4, remains nearly unreduced with increased load torque and increased feed voltage $U_{eff}$, from idling state to nominal load. Within this region, the speed $n_1$ drops only approximately 5 percent. This speed, on the other hand, drops somewhat more severely between the nominal load and the load which corresponds to one and a half times this nominal value. Within the range of the nominal load and the load which corresponds to twice the nominal value, the rotational speed drops approximately 23 percent. After that, the speed drops rapidly to zero, at which a stall torque prevails at approximately three-quarters of the nominal load value. As a result, a corresponding stall feed voltage remains.

The speed relationship $n_2$ of the same angle polisher, but without speed regulating means, is represented through dashed or broken lines. In this case, the rotational speed drops from the idling state to the nominal value or nominal load torque, by approximately 30 percent. This same situation applies for the speed function $n_3$ shown by dash-dot lines, corresponding to an angle polisher which is conventional in the trade or art. The speed of such a conventional device, is represented by the function designated $n_3$, is substantially below the speed of the electronically regulated angle polisher. From the difference between the dashed curves and the dash-dot curve, it is possible to observe that the angle polisher provided with electronic speed regulating means is designed so that it has a load speed which is substantially in the proximity of the conventional idling speed, heretofore.

It will be understood that each of the elements described above, or two or more together, may also find a useful application in other types of constructions differing from the types described above.

While the invention has been illustrated and described as embodied in electrically operated power tools, it is not intended to be limited to the details shown, since various modifications and structural changes may be made without departing in any way from the spirit of the present invention.

What I claim as new and desire to be protected by Letters Patent is set forth in the appended claims:

1. An electrical power tool with electronic speed control arrangement comprising, in combination, a motor with speed to be controlled when driving a variable load between no-load and full load operation of said motor; electronic speed regulating means connected to said motor for maintaining the rotational speed of said motor substantially constant between no-load and full load operation of said motor; a housing for enclosing said electronic speed regulating means integral with said motor; a handle member joined to said housing; and a terminal block member within said handle for holding connections between said motor and said electronic speed regulating means.

2. The motor speed control arrangement as defined in claim 1 including bearing means within the housing for mounting rotatably the rotor of said motor; cooling impeller means mounted on said rotor and rotating therewith for cooling said motor; and output driving linkage means connected to said rotor for driving a load.

3. The motor speed control arrangement as defined in claim 2 wherein said output linkage means comprises a bevel pinion mounted on said rotor; and a bevel gear in mesh with said bevel pinion, whereby the output axis of speed rotation is perpendicular to the axis of rotation of said rotor.

4. The motor speed control arrangement as defined in claim 3 including an output shaft driven by said bevel gear and having a threaded portion for threadably receiving a polishing disc, whereby said motor speed control arrangement is operable as an angle polisher.